United States Patent
Ngai (10) Patent No.: US 7,308,523 B1
(45) Date of Patent: Dec. 11, 2007

(54) FLOW-SPLITTING AND BUFFERING PCI EXPRESS SWITCH TO REDUCE HEAD-OF-LINE BLOCKING

(75) Inventor: Henry P. Ngai, Coto De Caza, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 96 days.

(21) Appl. No.: 11/308,597

(22) Filed: Apr. 10, 2006

(51) Int. Cl.
*G06F 13/00* (2006.01)

(52) U.S. Cl. ........................... 710/313; 710/316
(58) Field of Classification Search ............ 710/52–54, 710/310, 313, 316; 370/229, 363
See application file for complete search history.

(56) References Cited

U.S. PATENT DOCUMENTS

| | | | |
|---|---|---|---|
| 6,570,876 B1 | 5/2003 | Aimoto | 370/389 |
| 6,678,277 B1 | 1/2004 | Wils et al. | 370/412 |
| 6,765,867 B2 | 7/2004 | Shanley et al. | 370/229 |
| 6,804,194 B1 | 10/2004 | Kadambi et al. | 370/229 |
| 6,829,245 B1 | 12/2004 | Medina et al. | 370/413 |
| 6,850,490 B1 | 2/2005 | Woo et al. | 370/230 |
| 6,889,249 B2 | 5/2005 | Miloushev et al. | 709/213 |
| 6,904,047 B2 | 6/2005 | Han et al. | 370/414 |
| 7,058,071 B1 * | 6/2006 | Myles et al. | 370/419 |
| 2004/0019729 A1 | 1/2004 | Kelley et al. | 710/306 |
| 2005/0186933 A1 | 8/2005 | Trans | 455/296 |

* cited by examiner

*Primary Examiner*—Glenn A. Auve
(74) *Attorney, Agent, or Firm*—g Patent LLC; Stuart T. Auvinen

(57) ABSTRACT

An enhanced Peripheral Component Interconnect Express (PCIe) switch eliminates or reduces head-of-line blocking for memory reads initiated by peripheral endpoint devices. A memory-read request packet from a first peripheral endpoint device is intercepted by the enhanced PCIe switch, which generates a series of substitute request packets to the root complex and memory. The same requestor ID is used in all packets, but the original tag is replaced with a sequence of substitute tags in the substitute packets. The switch receives a sequence of reply packets with memory-read data, replaces substitute tags with original tags, and sends the reply packets to the peripheral endpoint device. Substitute request packets for different peripheral endpoint devices are alternately sent from the switch to the root complex to prevent head-of-line blocking by one peripheral endpoint device. The amount of data in each substitute request packet is smaller than the original requests to reduce blocking latencies.

20 Claims, 8 Drawing Sheets

PRIOR ART

FIG. 3

PRIOR ART

| STATUS | REQ ID | REQ PORT | OLD TAG | NEW TAG | # NEW REQS | REQS LEFT |
|---|---|---|---|---|---|---|
| ACTIVE | DEV_A | 21 | 5 | 17 | 3 | 1 |
| ACTIVE | DEV_B | 22 | 2 | 65 | 5 | 4 |
| PENDING | DEV_A | 21 | 6 | 20 | 2 | 2 |
| PENDING | DEV_C | 23 | 18 | 128 | 8 | 8 |
| PENDING | DEV_D | 21 | 7 | 22 | 8 | 8 |
| EMPTY | DEV_A | 21 | 3 | 30 | 3 | 0 |

FIG. 9      50

FLOW-SPLITTING AND BUFFERING PCI EXPRESS SWITCH TO REDUCE HEAD-OF-LINE BLOCKING

FIELD OF THE INVENTION

This invention relates to peripheral buses, and more particularly to splitting bus transactions to reduce head-of-line blocking.

BACKGROUND OF THE INVENTION

Computers and other systems may be expanded in functionality by adding peripheral devices. A wide variety of peripheral devices are available, such as printers, communications and network devices, cameras, music players, and many other devices. In additional to semi-permanent devices, portable devices may be temporarily connected to a host computer using a peripheral bus.

Peripheral buses that connect peripheral devices to a host such as a personal computer (PC) follow different standards. Peripheral Component Interconnect (PCI) is a widely-deployed peripheral bus standard. Peripheral Component Interconnect Express (PCIe) is a newer standard that employs a high speed serial bus. PCIe is quickly gaining acceptance.

Figure 1:
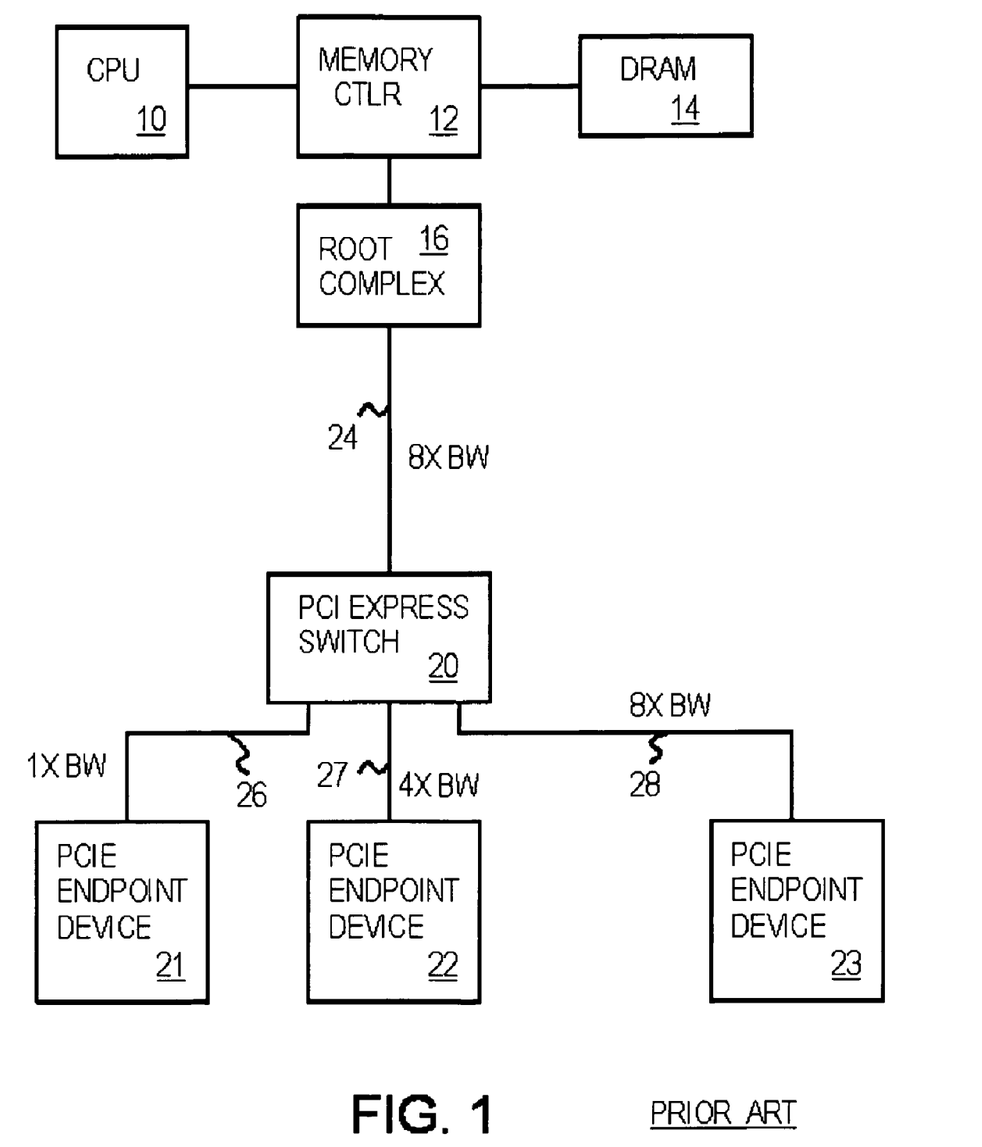
FIG. 1 shows a typical PCIe system.

FIG. 1 shows a typical PCIe system. Instructions in programs are executed by central processing unit CPU processor 10. Instructions and data may be stored in dynamic-random-access memory (DRAM) memory 14, or in some other memory. Memory controller 12 buffers addresses and data from processor 10 to memory 14, and may generate control signals that are specific to the type and speed of memory chips in memory 14.

Memory controller 12 may also have bus-bridge logic that allows processor 10 to write and data to and from peripheral devices on a peripheral bus. Root complex 16 acts as the head or root of a peripheral bus that connects to several peripheral devices at endpoints that resemble a tree-like structure. Simpler bus protocols only allow processor 10 to initiate any transfers over the peripheral bus, while more advanced or extended bus protocols allow endpoint peripheral devices to initiate transfers as bus masters. For example, peripheral endpoint device 21 might initiate a transfer as a bus master, reading memory 14 directly, without using processor 10. Bus mastering is often preferred since processor 10 may not be delayed by the direct transfer.

Some peripheral buses such as PCIe may allow for differing speeds on different links of the bus. PCIe switch 20 has one uplink port to root complex 16, bus link 24, which operates at a higher 8× speed or bandwidth. PCIe switch 20 has three downlink ports to downstream peripheral endpoint devices 21, 22, 23, over bus links 26, 27, 28.

Peripheral endpoint device 23 may be a high-speed peripheral, allowing bus link 28 to operate at the higher 8× speed, while peripheral endpoint device 21 is a slower Peripheral endpoint device 22 may be an intermediate-speed peripheral, allowing bus link 27 to operate at a 4× speed.

When processor 10 reads or writes data to peripheral endpoint device 23, root complex 16 and PCIe switch 20 can operate at the higher 8× speed. However, when processor 10 reads or writes data to peripheral endpoint device 21, PCIe switch 20 can send data over bus link 26 only at the minimum 1× speed.

Figure 2:
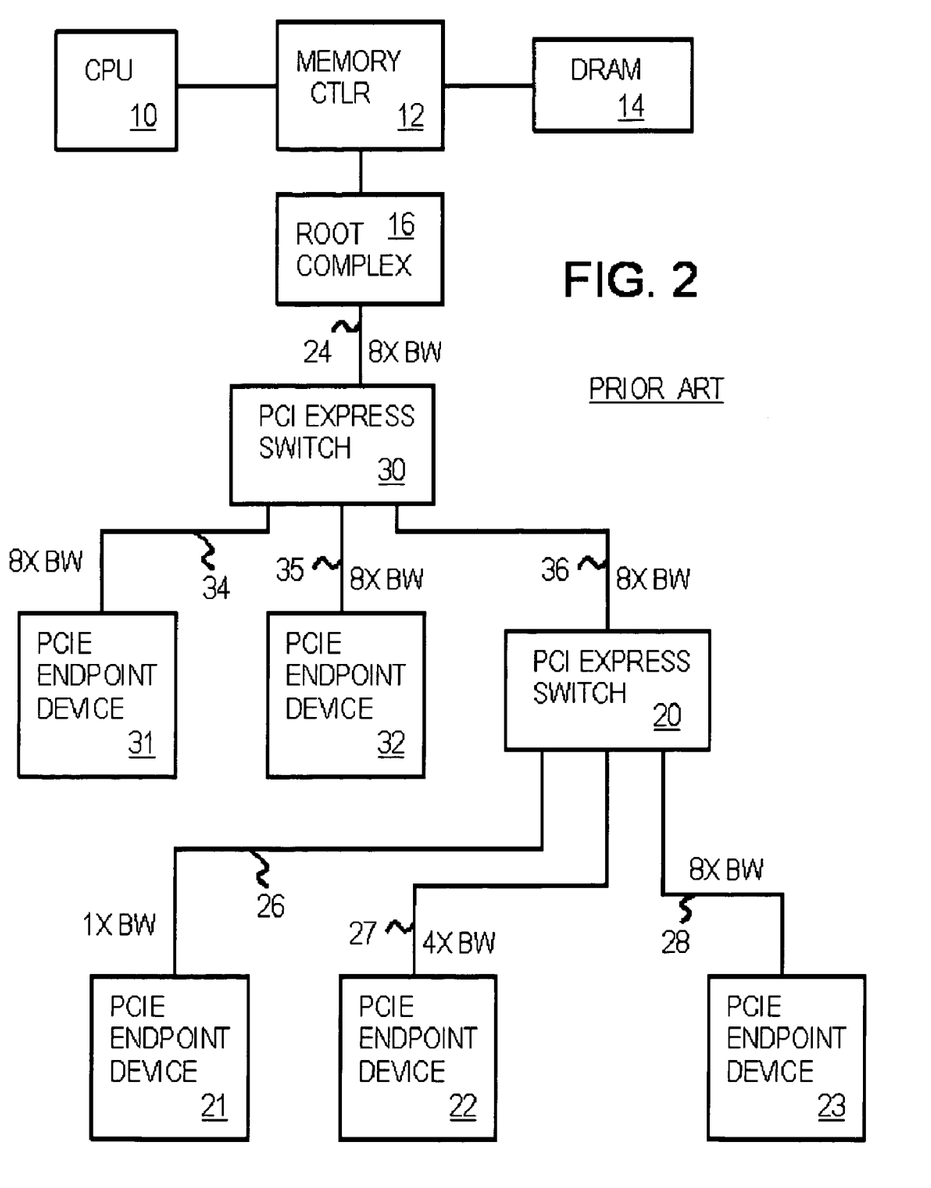
FIG. 2 shows a multi-level peripheral bus.

FIG. 2 shows a multi-level peripheral bus. There may be several levels of PCIe switches between root complex 16 and peripheral endpoint devices. PCIe switch 30 connects to root complex 16 over bus link 24, and also connects to peripheral endpoint devices 31, 32 over high-speed bus links 34, 35. One of the downlink ports from PCIe switch 30 connects to PCIe switch 20 over switch bus link 36, which can also operate at 8× bandwidth.

Although some peripheral endpoint devices 23, 31, 32 and both PCIe switches 20, 30 can operate at the higher 8× bandwidth, when a data transfer to a slower peripheral endpoint device 21 occurs, data transfer rates slow down to match the slower peripheral endpoint device 21. Other peripheral endpoint devices may have to wait while the slower transfer to peripheral endpoint device 21 occurs, even though PCIe switches 20, 30 could handle more data. For example, a pending transfer to 8× peripheral endpoint device 23 may have to wait until a transfer to 1× peripheral endpoint device 21 finishes, since both transfers go though PCIe switch 20. The current transfer to slower peripheral endpoint device 21 is at the head of the line, or top of the queue, and delays or blocks pending transfers to other peripheral endpoint devices. This is known as head-of-line blocking.

As the transfer of data slows down on high speed link 26, buffers in switch 20 become full, and switch 20 cannot accept additional data, thus reducing the effective speed on high speed link 36. The slow down of high speed link 36 eventually causes the buffer in switch 30 to fill up, and eventually slows down high speed link 24, degrading the performance of the entire system. A slow device thus can create head of line blocking that can paralyze the entire system in a switching environment.

Head-of-line blocking can degrade performance of a peripheral bus such as PCIe. Buffers may be added to PCIe switches 20, 30 to allow data to be stored in the PCIe switch from the higher-speed bus link, and then transferred to the slower peripheral endpoint device. Such buffering may allow transfers to higher-speed peripheral endpoint devices to experience less delay. Ideally, buffers large enough to store an entire transfer to a slower peripheral endpoint device are provided in PCIe switch 20. However, data transfers may be quite large, and may occur over extended periods of time, causing the size of such a buffer to be prohibitively large.

Software may tend to prefer to use larger sizes of data payloads or larger packets, since the relative overhead as a percentage of the total transfer is decreased for larger payloads. For example, a transfer header may be a fixed size, such as 128 bytes. The overhead for the header is much larger percentage for a data payload of 256 bytes than for a payload of 4K bytes. Thus software tends to use larger packet sizes by partitioning data into fewer large packets rather than many smaller packets.

Figure 3:
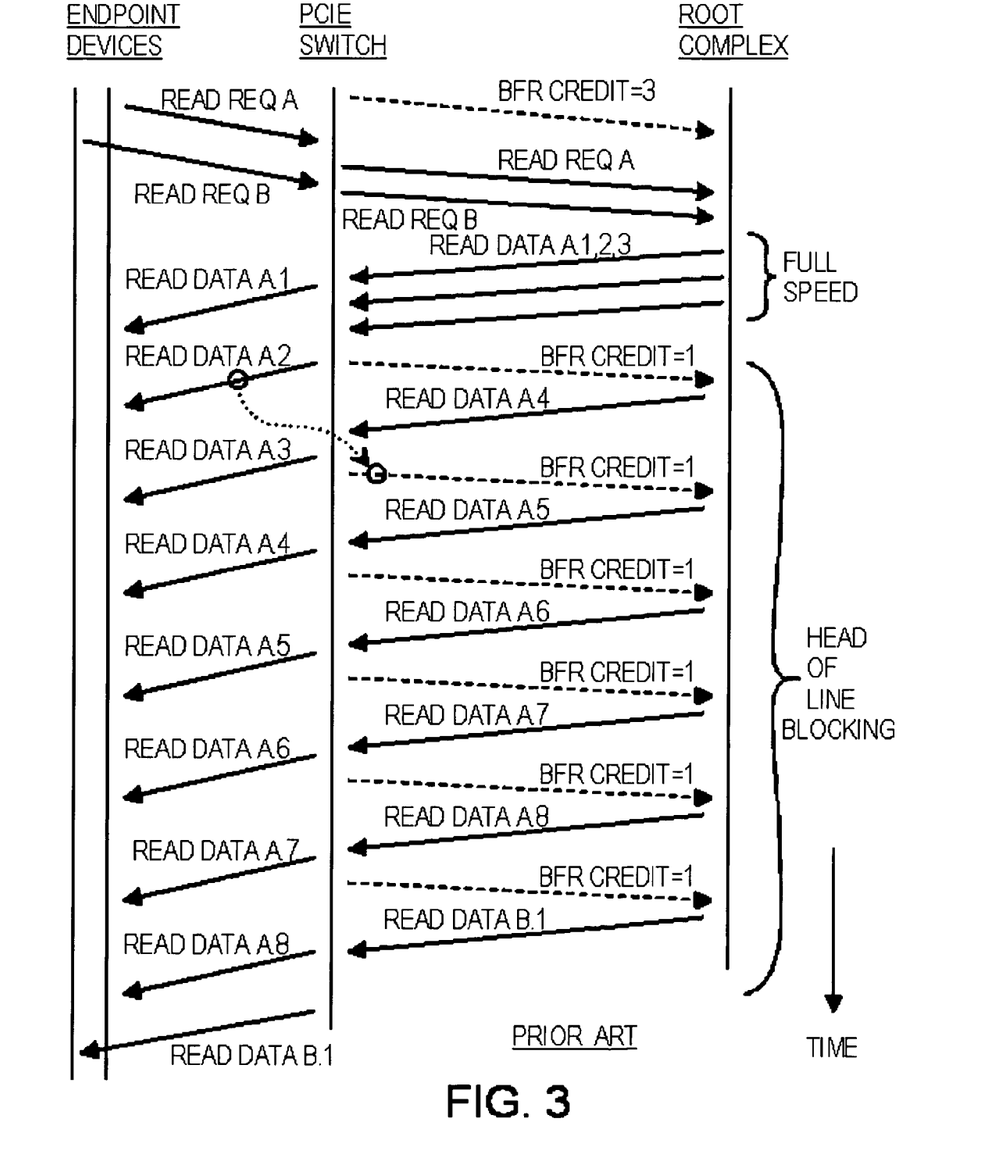
FIG. 3 is a transfer diagram showing head-of-line blocking in a peripheral bus.

FIG. 3 is a transfer diagram showing head-of-line blocking in a peripheral bus. The PCIe switch connects to the root complex using a 16× bandwidth, while the two one peripheral endpoint devices connect over 8× bus links. The PCIe switch sends a message to the root complex that indicates that there are empty buffer spaces in the PCIe switch. Both peripheral endpoint devices send requests to the PCIe switch, with peripheral endpoint device A arriving first, ahead of the request from peripheral endpoint device B. These requests are to read from memory 14 through PCIe switch 20 and root complex 16 of FIG. 1. Peripheral endpoint devices 21, 23 act as bus masters.

The requests from peripheral endpoint devices A, B are passed on from the PCIe switch to the root complex. The root complex uses the memory controller to read data from the memory. Since the data is large, the root complex divides the requested data into several reply packets for each request.

In response to read request A, the root complex sends three packets A.1, A.2, and A.3 to the PCIe switch. Since the PCIe switch can only store 3 packets, the root complex can only send the first 3 reply packets until the buffer in the PCIe switch becomes full. These 3 packets are sent at the full line rate of the high-speed bus link between the root complex and the PCIe switch.

The PCIe switch passes the data packets to the requesting peripheral endpoint device A as read data A.1, A.2, and A.3. As each packet is read from the buffer in the PCIe switch and sent to the peripheral endpoint device, an entry in the buffer is made available. A buffer credit is reported back to the root complex from the PCIe switch as each packet is read and sent to the peripheral endpoint device. However, there may be some delay in reporting these buffer credits as shown.

When the message with the buffer credit is received by the root complex, the root complex sends another reply packet to the PCIe switch. For example, reply packet A.4 is sent once the first buffer credit=1 message is received. Then reply packet A.5 is sent after the second buffer credit=1 message is received. This continues until all 8 reply packets for request A are sent to the PCIe switch. Then reply packets for request B can be sent, starting with reply packets B.1, B.2, etc.

Since the B.1 reply packet must wait until all 8 read A reply packets are sent, the B packets are blocked by the pending A request. The delay is increased since the A reply packets are sent at a slower rate. While the initial 3 reply packets A.1, A.2, A.3 are sent quickly at the higher line rate, the later packets A.4, A.5, ... A.8 are sent only after each buffer credit message is received by the root complex. These buffer credit messages are created only as each packet is read from the buffer in the PCIe switch.

This reading of packets from the buffer in the PCIe switch is limited to the speed of the slow bus link to the peripheral endpoint device A. Thus the blocking delay is worsened by the slow bus link. The back-up extends back to the root complex, even though a high-speed bus link connects to the root complex. This blocking can block all requests, even to high-speed peripheral endpoint devices or other PCIe switches, and even when bus links can operate at higher speeds. Thus the system slows down to the speed of the slowest peripheral endpoint device when head-of-line blocking occurs. Furthermore, these delays can be cumulative—as more requests to slow links are received, the delays increase.

While increasing the buffer size in the PCIe switch is useful, very large buffer sizes may be needed. A maximum packet size may be 4K bytes. However, each peripheral endpoint device may have several levels of operation, resulting in several flows that can be active at the same time. Each flow can receive packets of up to 4K bytes each. Thus each peripheral endpoint device may require 8K, 16K, or 32K bytes or more of buffering. When a PCIe switch connects to several peripheral endpoint device, the size of the buffer may exceed several hundred K bytes. This large buffer size is undesirable.

What is desired is a PCIe switch that reduces or avoids delays from head-of-line blocking while using relatively smaller buffers. A PCIe switch that can fragment requests to allow requests from faster peripheral endpoint devices to move ahead of a pending request from a slow peripheral endpoint device is desired.

DETAILED DESCRIPTION

The present invention relates to an improvement in switches to prevent head-of-line blocking. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that bus-master reading of the processor's memory is usually more efficient that host-initiated writes to the peripheral endpoint device. System performance can be improved by optimizing these bus-master memory reads. The inventor realized that in a system with both slow and fast peripherals, head-of-line blocking can significantly degrade overall performance.

While the traditional solution for head-of-line blocking is to increase buffer sizes at intermediate switches, this can be ineffective for PCIe switches. Simply increasing buffer sizes in intermediate switches can be ineffective since some peripheral endpoint devices may be multifunction cards that can perform several quasi-independent functions. Each function can have its own data flows and require its own buffer in the switch. Thus the actual required buffer space in the switch is a multiple of the number of peripheral endpoint devices.

The inventor has further realized that a PCIe switch can be enhanced to fragment a read request from a peripheral endpoint device into several read requests. The enhanced PCIe switch receives one request from a peripheral endpoint device that is acting as a bus master. The enhanced PCIe switch creates several requests and sends these requests up to the root complex for reading the processor's memory. Requests from other peripheral endpoint device can be interleaved with the fragmented requests, allowing the other peripheral endpoint devices to obtain bandwidth to the root complex and processor memory. Thus these other peripheral endpoint devices are no longer blocked, or at least not blocked for as long of a period of time, since the slow device's request was fragmented.

Figure 4:
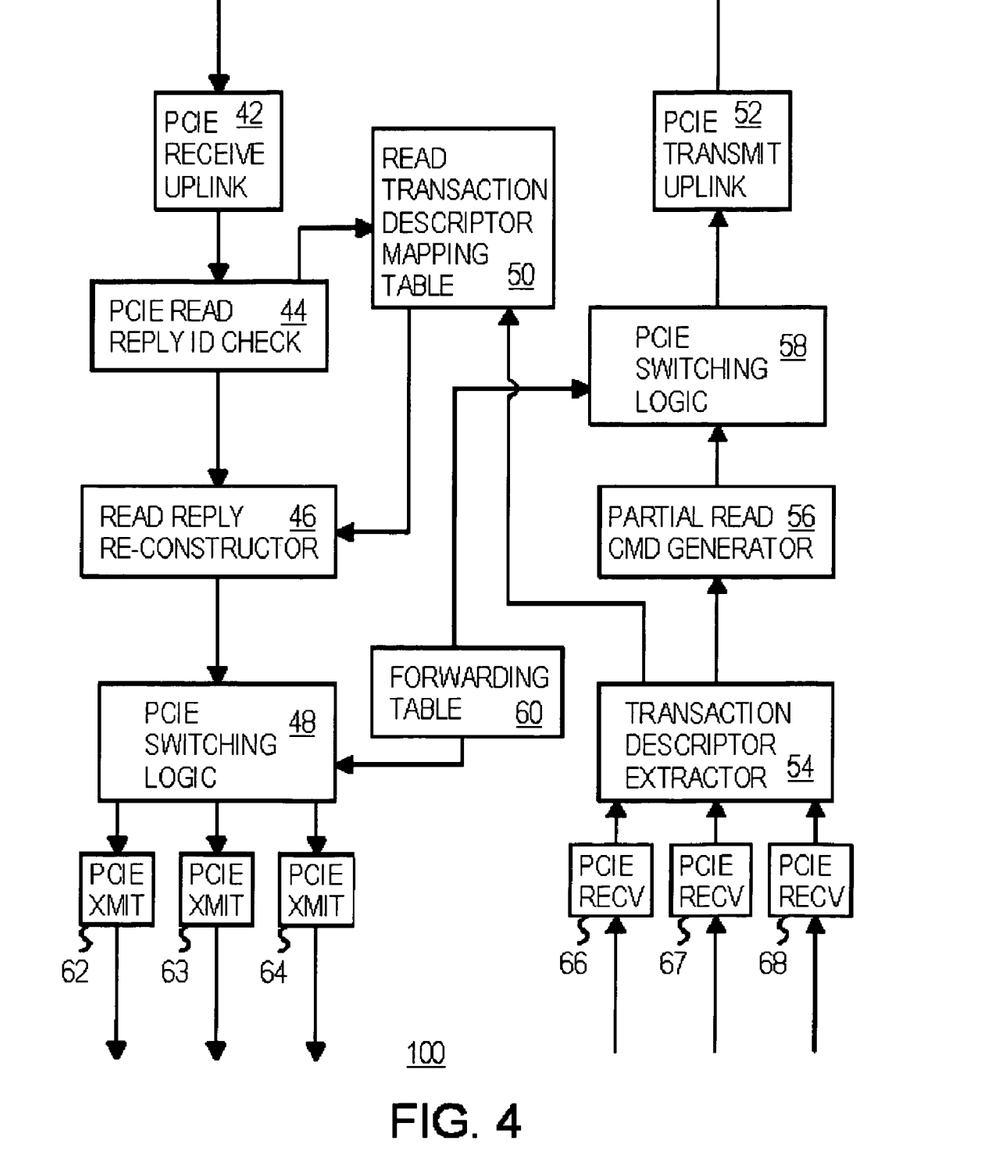
FIG. 4 show an enhanced PCIe switch that fragments requests from a slow peripheral endpoint device for bus-master memory reads.

FIG. 4 show an enhanced PCIe switch that fragments requests from a slow peripheral endpoint device for bus-master memory reads. Only the logic for bus-master memory reads is shown in FIG. 4. An actual enhanced PCIe switch has many more blocks (not shown) for other kinds of transfers, such as bus-master memory writes, processor (host) initiated reads and writes, and configuration and control logic.

Enhanced PCIe switch 100 has four ports—one uplink port and three downlink ports. The uplink port (at the top of FIG. 4) could connect to a root complex or to an upstream PCIe switch, while the downlink ports (at the bottom of FIG. 4) could connect to peripheral endpoint devices or to downstream PCIe switches.

Uplink and downlink ports are bidirectional. Messages and packets sent up toward the root complex and the processor's memory are sent by uplink transmitter 52, while messages and packets received from the root complex, which can include data read from the processor's memory, are received by uplink receiver 42.

A first peripheral endpoint device or downstream switch connects through a first downlink port that includes downlink transmitter 62 and downlink receiver 66. Another peripheral endpoint device or downstream switch connects through a second downlink port that includes downlink transmitter 63 and downlink receiver 67. A third peripheral endpoint device or downstream switch can connect through a third downlink port that includes downlink transmitter 64 and downlink receiver 68. When each port contains separate media for send and receive, full duplex transmission and receiving is possible since the downlink transmitter and downlink receiver can act independently of each other.

When a peripheral endpoint device becomes a bus master and initiates a read of the processor's memory behind the root complex, the peripheral endpoint device sends a read request packet that is received by one of downlink receivers 66, 67, 68. Each packet contains a header before any data payload. The header contains a transaction descriptor that includes a unique identifier (ID) called a transaction ID. Each request from a peripheral endpoint device has a different transaction ID, so the transaction ID uniquely identifies a particular request for a device. Transaction descriptor extractor 54 reads the transaction ID from the incoming request and stores the transaction ID in an entry in mapping table 50.

A series of new or substituted transaction ID's are generated and stored or associated with the entry in mapping table 50. These substituted transaction ID's replace the original transaction ID in a series of packets that are generated by partial read command generator 56. Partial read command generator 56 creates several packets that are similar to the packet received from the downstream peripheral endpoint device, except that the original transaction ID is replaced by a substituted transaction ID that is indicated by the association in the entry in mapping table 50.

Partial read command generator 56 also adjusts the read lengths and read address for the series of requests being generated. The original packet received from the downstream peripheral endpoint device has an original read address that is the starting address of a block to be read from the processor's memory. The original packet also has a length of data to read. When a series of packets are generated, each new packet has a smaller read length. For example, when the original packet requested a read length of 4K bytes, and a series of 8 packets is generated from the original packet, then each new packet can have a read length of 512 bytes.

The read address for a new request packet being generated is the original read address, plus the sum of the read lengths of any other request packets that have already been generated by partial read command generator 56. The read address is thus an offset into the block of data being read that is advanced to account for prior reads.

Switching logic 58 receives the series of read-request packets that are generated by partial read command generator 56. These packets are sent up toward the root complex through switching logic 58 so that the processor's memory can be read. However, several peripheral endpoint devices may be requesting to read the processor's memory or to communicate with the processor at the same time. Then switching logic 58 interleaves request packets from different peripheral endpoint devices, rather than send all packets in one series from one peripheral endpoint device before sending packets from other peripheral endpoint devices.

This interleaving by switching logic 58 can be accomplished by a pay-as-you-go priority scheme, or by more complex priority schemes. A simple scheme is to have up to two outstanding partial read requests per endpoint peripheral device. Switching logic 58 prevents head-of-line blocking by sending packets generated for each of downlink receivers 66, 67, 68 in some non-blocking order. Rather than send all packets in a first series for one peripheral endpoint device before sending packets in a second series for another peripheral endpoint device, packets in the first series and the second series are alternated. Thus the second series of reply packets are not blocked by the first series of reply packets.

In interleaving, switching logic 58 reads only one packet generated by partial read command generator 56 from a request from first downlink receiver 66, then reads one packet generated by partial read command generator 56 from a request from second downlink receiver 67, and then reads one packet generated by partial read command generator 56 from a request from third downlink receiver 68 before reading and sending a second packet generated by partial read command generator 56 from the request from first downlink receiver 66.

Partial read command generator 56 may also generate different series of packets for different flows from the same peripheral endpoint device. These different series of packets from the same peripheral endpoint device also may be interleaved by switching logic 58. Thus intra-device head-of-line blocking may also be avoided.

The root complex activates the memory controller to read data from the processor's memory in response to the series of packets received from uplink transmitter 52 on enhanced PCIe switch 100. Multiple data reply packets containing the data read from memory may be generated, since the data read may be lengthy. These data reply packets are received from the root complex by uplink receiver 42. Reply ID checker 44 reads the substituted transaction ID from an incoming packet and looks up the substituted transaction ID in mapping table 50. The root complex uses the same substituted transaction ID for the data reply packets that was containing in the request packet, which was one of the series of packets generated by partial read command generator 56. Thus there should be an entry in mapping table 50 for this substituted transaction ID.

When the entry in mapping table 50 having the matching transaction ID is found, the original transaction ID is read from mapping table 50. Read reply re-constructor 46 replaces the substituted transaction ID in the read reply packet with the original transaction ID. The read reply packet with the original transaction ID is passed on by read reply re-constructor 46 to switching logic 48.

Forwarding table 60 may also help to filter packets with the wrong address to prevent them from passing through. In one embodiment where an end point device only connects to the root complex, such filtering is not necessary. However, when peer to peer switching (traffic) is allowed, then forwarding table 60 can block such traffic.

Peripheral endpoint devices are identified by a device ID within the transaction ID. Forwarding table 60 is programmed by the root complex during initialization, or after a peripheral endpoint device is plugged in or removed and the peripheral network is re-configured. Forwarding table 60 maps the device ID to one of the three downlink ports. When one of the downlink ports connects to a downstream PCIe switch, multiple device ID's (for peripheral endpoint devices that connect to the downstream PCIe switch) may map to the same downlink port.

Forwarding table 60 causes switching logic 48 to route packets to the proper one of downlink transmitters 62, 63, 64 so that the packet reaches its intended peripheral endpoint device corresponding to the device ID.

Figure 5A:
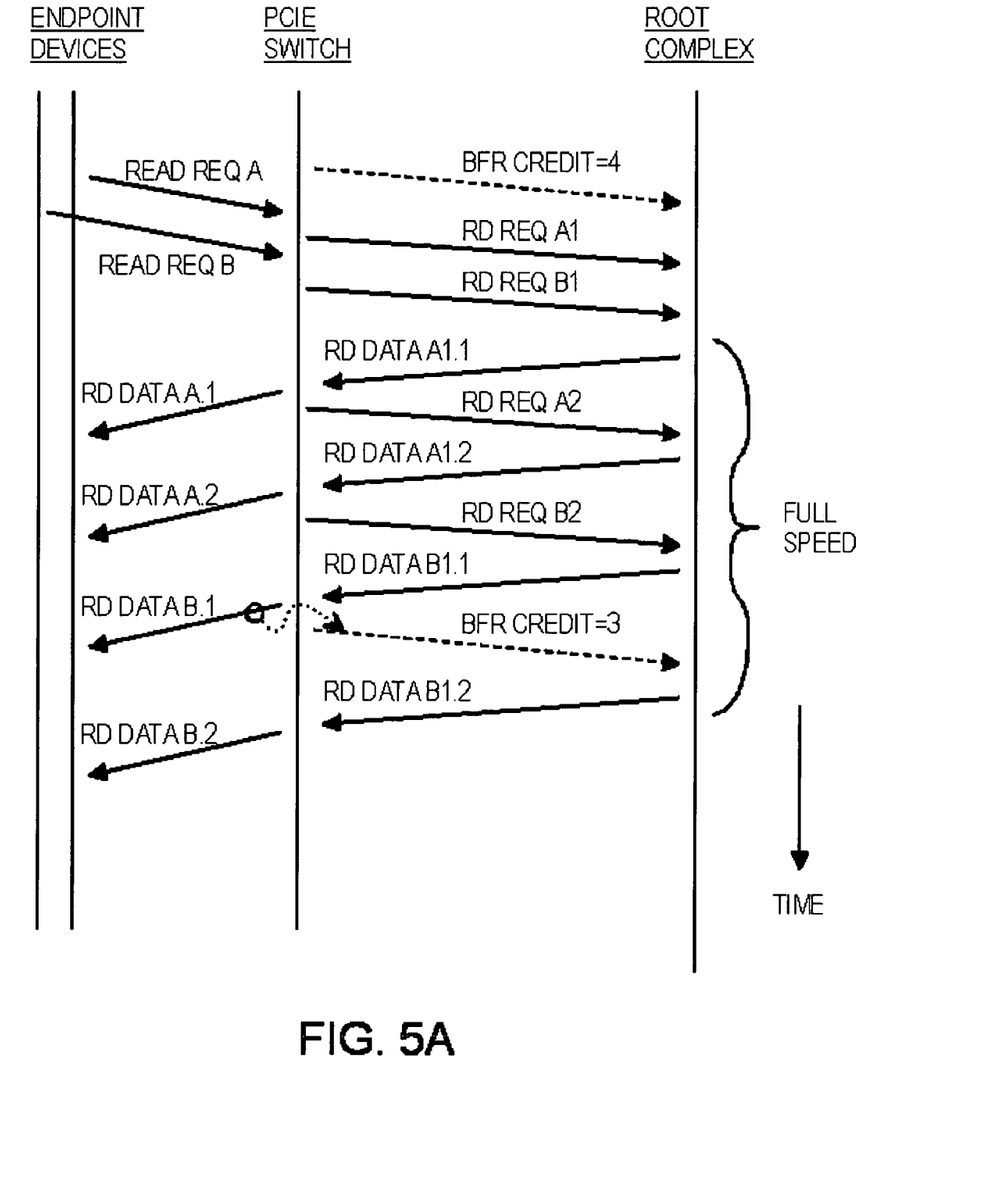
FIGS. 5A-B are flow diagrams showing interleaving of two series of request packets generated to prevent head-of-line blocking.
Figure 5B:
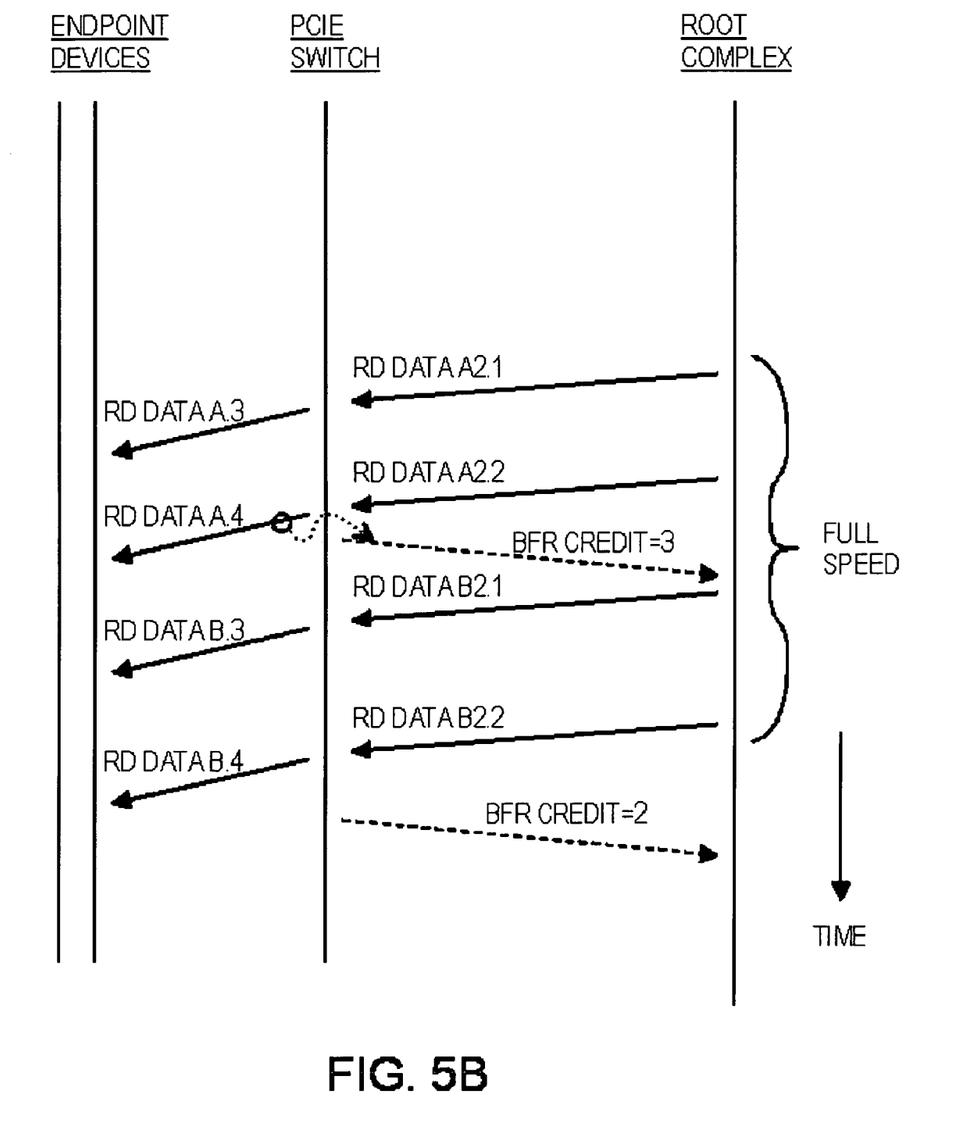

FIGS. 5A-B are flow diagrams showing interleaving of two series of request packets generated to prevent head-of-line blocking. In FIG. 5A, two read request, read request A and read request B, are sent to the enhanced PCIe switch from two different peripheral endpoint devices. These requests are fragmented into multiple substitute request packets that are generated by partial read command generator 56 in enhanced PCIe switch 20 (FIG. 4). For example, read request A, the original read request packet, causes two substitute read-request packets to be generated, RD REQ A1 and RD REQ A2. Likewise, read request B, another original read request packet, causes two substitute read-request packets to be generated, RD REQ B1 and RD REQ B2.

The substitute read request packets for A and B are interleaved by switching logic 58. First RD REQ A1 is sent to the root complex, then RD REQ B1 is sent ahead of RD REQ A2. Finally RD REQ B2 is sent. If there were more substitute packets in the series, the A and B packets would be sent alternately, such as A3, B3, A4, B4, A5, B5, etc. When three devices request reads at the same time, the substitute packets sent to the root complex could alternate as A1, B1, C1, then A2, B2, C2, A3, B3, C3, etc. The number of outstanding partial read requests may be limited by the amount of buffer space in the enhanced PCIe Switch. Additional partial read requests may be sent only after previous read results had been received and forwarded to downstream devices.

The buffer credit from the enhanced PCIe switch is reported to the root complex as 4 initially. The root complex activates the memory controller to read the data requested in RD REQ A1. However, there is so much data that two reply packets are generated by the root complex, RD DATA A1.1 and RD DATA A1.2, which are sent from the root complex to the enhanced PCIe switch. The transaction ID's are replaced by read reply re-constructor 46 in the switch and sent back to the requesting peripheral endpoint device A as read reply packets RD DATA A.1 and RD DATA A.2.

The root complex can send 2 more packets before the buffer credit is depleted. The root complex activates the memory controller to read the data requested in RD REQ B1. Two reply packets are generated to contain the data, RD DATA B1.1 and RD DATA B1.2, which are sent from the root complex to the enhanced PCIe switch. The transaction ID's are replaced by read reply re-constructor 46 in the switch and sent back to the requesting peripheral endpoint device B as read reply packets RD DATA B.1 and RD DATA B.2.

The four reply packets from the root complex, RD DATA A1.1, RD DATA A1.2, RD DATA B1.1 and RD DATA B1.2, deplete the initial buffer credit of 4. However, new buffer credits are generated as reply packets are sent to the peripheral endpoint devices. After reply packets RD DATA A.1, RD DATA A.2, and RD DATA B.1 are sent, there are 3 openings in the data buffer in the enhanced PCIe switch. A buffer credit of 3 is reported back to the root complex by the enhanced PCIe switch after the third packet, RD DATA B.1, is successfully sent. The enhanced PCIe switch may wait for verification that reception by the peripheral endpoint device was OK before releasing the buffer credit, or the switch may release the buffer credit early and reply on other error processing should an error occur.

With the new buffer credit of 3, the root complex can now send 3 more read reply packets to the enhanced PCIe switch. In FIG. 5B, the root complex activates the memory controller to read the data requested in RD REQ A2. Two reply packets are generated by the root complex, RD DATA A2.1 and RD DATA A2.2, and sent from the root complex to the enhanced PCIe switch. The transaction ID's are replaced by read reply re-constructor 46 in the switch and sent back to the requesting peripheral endpoint device A as read reply packets RD DATA A.3 and RD DATA A.4.

The root complex can send 1 more packet before the buffer credit is depleted. However, another buffer credit is received as RD DATA A2.1 and RD DATA A2.2 are being sent, so the root complex can send 2 more packets. The data requested by request packet RD REQ B2 is contained in two reply packets RD DATA B2.1 and RD DATA B2.2, which are sent from the root complex to the enhanced PCIe switch. The transaction ID's are replaced by read reply re-constructor 46 in the switch and sent back to the requesting peripheral endpoint device B as read reply packets RD DATA B.3 and RD DATA B.4. As these packets are sent from the enhanced PCIe switch, more buffer credits are reported back to the root complex.

Interleaving of the A and B device requests allows for full-speed operation. The root complex does not have to wait while buffer credits are being returned. Instead, the buffer credits are returned quickly because the enhanced PCIe switch does not experience head-of-line blocking. The enhanced PCIe switch is able to send packets to both devices A and B over different bus links at the same time.

The sequence described above, if using some kind of credit based Partial Request release method, may not be so uniform. The sequence of A1, B1, C1, A2, B2, C2 and A3, B3, C3 could very well become, A1, B1, C1, A2, C2, B2, and followed by C3, A3, B3. C3 could come out first because the down link to Device C could be must faster than links for device A and B. So C1 could be emptied from the switch buffer before A1 or B1, so C3 jumps ahead.

Figure 6:
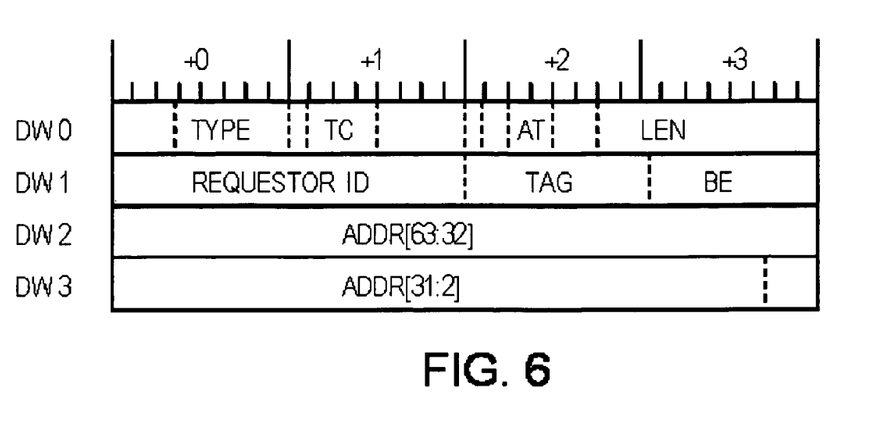
FIG. 6 shows a header for a PCIe packet.

FIG. 6 shows a header for a PCIe packet. Some fields may be non-contiguous, other fields and reserved bits may be present, and other formats are possible. A header for a read request packet is shown. The first double-word DW0 contains a type and a traffic class (TC) field. The length of the packet's payload is contained in length field LEN, while some attributes are contained in attributed field AT. Attributes may include read or write, snoop disabling, relaxed ordering, etc. The second double-word DW1 contains the requestor ID, a unique tag, and byte enables. The 64-bit read address within the processor's memory is contained in address fields in the third and fourth double word.

Figure 7:
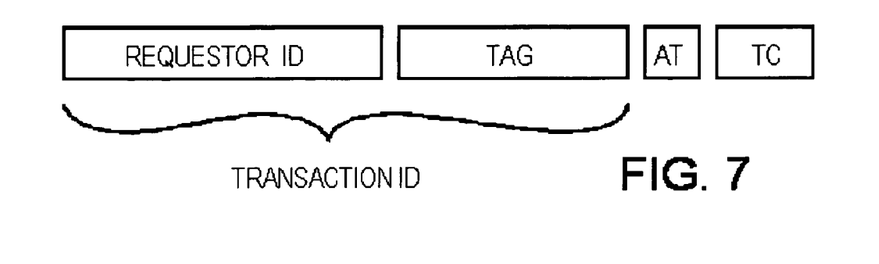
FIG. 7 shows formation of the transaction ID from fields in the header.

FIG. 7 shows formation of the transaction ID from fields in the header. The transaction ID for the packet is formed by concatenating the requestor ID field with the tag field. Attributes and traffic class may follow the transaction ID in a re-assembled packet. The tag is generated by each peripheral endpoint device so that the transaction ID is unique for each separate request. The tag could be generated by a counter in the peripheral endpoint device, or by some other method.

Figure 8:
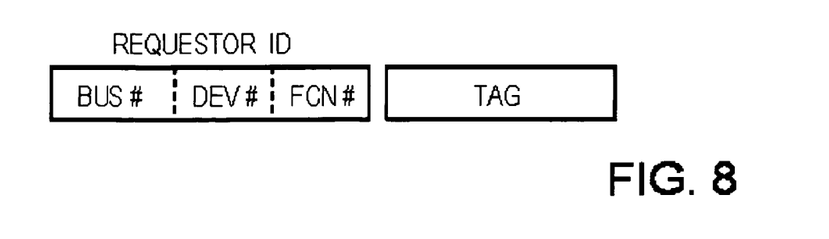
FIG. 8 highlights components of a transaction ID.

FIG. 8 highlights components of a transaction ID. The requestor ID is composed of a bus number, a device number, and a function number. The bus number indicates which of several possible buses or bus segments the device is located on. The bus number may be assigned by the root complex during initialization or re-configuration, or by the host boot-up routines. The device number may be assigned by management software during initialization.

Each peripheral endpoint device may be a multi-function peripheral that can perform many separate functions, often independently of one another. Each function within a peripheral endpoint device can be assigned a different function number. Each function may generate its own request and have its own data flows separate from other data flows from the same peripheral endpoint device.

The value of the tag is generated by the peripheral endpoint device for each new request from the device. The tag can be incremented for each new request so that no two requests issued close in time to each other can have the same combination of tag and requestor ID.

Figure 9:
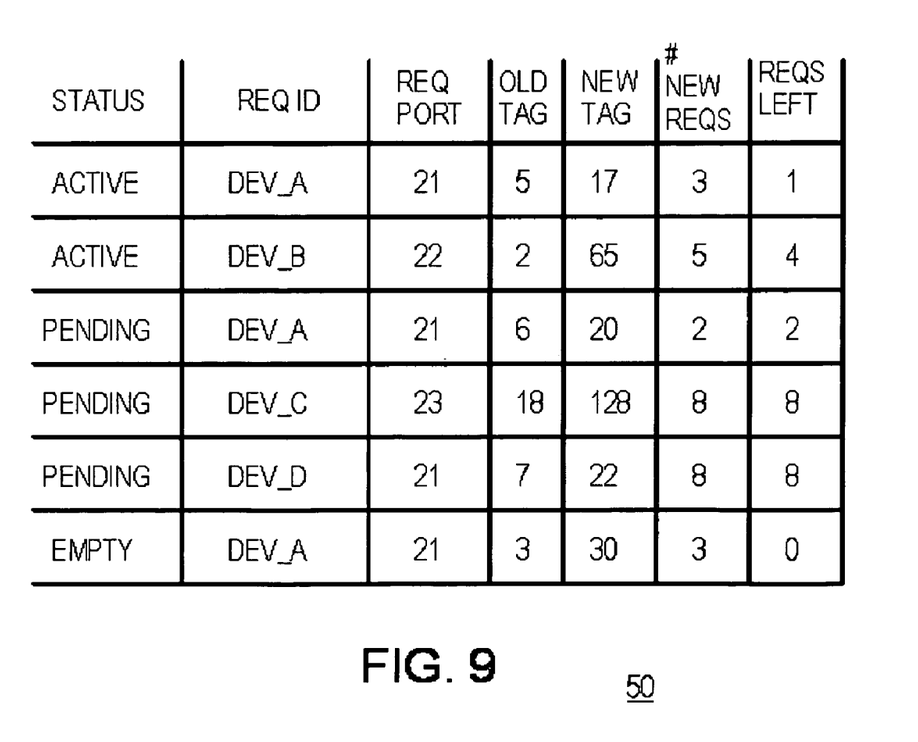
FIG. 9 shows entries in the mapping table.

FIG. 9 shows entries in the mapping table. Mapping table 50 (FIG. 4) contains entries that map original transaction ID's to substituted transaction ID's for the series of packets generated from one original request packet. Rows in the table correspond to mapping entries. Fields that can be contained in an entry include a status field, the requestor ID, the original tag from the original packet's transaction ID, the substituted tag that is generated by partial read command generator 56 (FIG. 4), the number of new request packets in the series of packets generated by partial read command generator 56, and the number of request packets that have not yet been replied to.

The first entry was created in response to a request from peripheral endpoint device A. The original tag, 5, was generated by peripheral endpoint device A. The substitute tag, 17, is generated by partial read command generator 56. There are 3 new read requests generated from the original request packet. Two read reply packets have been received from the root complex by read reply re-constructor 46, and enhanced PCIe switch 100 is waiting for one more reply packet before the entry can be marked "empty" and re-used. The entry has an "active" status when a partial read request is sent, but not all reply packets have been received. Once all reply packets have been received for a given partial read request, the number of outstanding requests is decremented.

The second entry was created in response to a request from peripheral endpoint device B. The original tag, 2, was generated by peripheral endpoint device B. The substitute tag, 65, is generated by partial read command generator 56. There are 5 new partial read request packets generated from the original request packet. The read reply packet for the first partial read request has been received from the root complex by read reply re-constructor 46, and enhanced PCIe switch 100 has more outstanding partial read requests before the entry can be marked "empty" and re-used. The entry has an "active" status since some but not all partial read requests have been completed.

The new tag field can show the first tag generated (65) for the first new packet. The other new packets can have substitute tag values that are incremented, such as 66, 67, 68, and 69, for the second, third, fourth, and fifth new packets. Thus tag values in the range of 65-69 are used by this entry. While all tag values could be stored in this entry, or the first and last tag values, the last tag value can be calculated from the number of new packets field.

The third entry was also created in response to a request from peripheral endpoint device A, such as from a different function in the device than the first entry. The original tag, 6, was generated by peripheral endpoint device A. The substitute tag, 20, is generated by partial read command generator 56. There are 2 new packets to be generated from the original request packet. The partial read request packet has not been sent, thus the status is "PENDING"

Enhanced PCIe switch 100 is on its way to send the first partial read request with TAG=20. This is because the only active partial read request is from Device A with TAGS equal to 19 (17+2 partial read request already completed.) The status changes to "active" once the first partial read request on behalf of Device A with TAG=20 is sent.

The last entry is marked "empty" since all three partial read requests have been completed. This entry can be over-written by a new entry.

All incoming read requests create a "Pending" entry. When a partial read request is sent on behalf of a pending request, the status becomes "ACTIVE". A partial read request is sent, and is waiting for data to return from Root Complex or upstream device. Once all the data for a given partial read request returns, the partial read request is completed, and the "Requests Left" field is incremented by one. When the Requests Left field reaches zero, the Status field becomes Empty. This means that the entry is no longer needed. Upon receiving a reply packet from the Root Complex, the switch only needs to check the active entry to find a match.

ALTERNATE EMBODIMENTS

Several other embodiments are contemplated by the inventors. For example various formats may be substituted for mapping table 50. Not all fields are needed in mapping table 50. For example, the number of packets left may be removed in some embodiments. Components may be implemented in hardware, software, firmware, or various combinations.

While PCIe has been described as the bus protocol, the invention could be applied to other switched-peripheral or processor buses, such as Hyper Transport and Rapid IO buses. The invention is particularly useful for memory reads that are initiated by the peripheral as a bus master, but could be useful for other kinds of transfers such as IO reads, or data requested by one processor from a second processor, or reading data over an IP network or another kind of network. The invention may be extended to advanced switching (AS) with PCIe. A wireless media may be used, such as with 802.11 or WiMax.

A range of substitute tag values could be reserved for each entry, such as 64 tag values for each entry, regardless of the number of new packets generated. This reserved range could be larger than the maximum number of packets that could be generated. The series of substitute packets could have tags that are in a contiguous series, either increasing or decreasing by one or more, or could contain a non-contiguous series of tag values such as a pre-determined sequence. Unique ID's could be generated in a sequence or randomly.

Reply packets could be combined or accumulated into larger reply packets before sending the packets to the peripheral endpoint devices, or separate reply packets from the root complex could be passed through without combining.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An enhanced switch with reduced head-of-line blocking comprising:
    an uplink port for sending substitute request packets toward a root complex and for receiving substitute reply packets from the root complex, the substitute reply packets containing reply data read from a memory in response to the substitute request packets;
    a plurality of downlink ports for connecting to a plurality of peripheral endpoint devices, each downlink port for receiving original request packets from a peripheral endpoint device with a request to read the memory through the root complex, each downlink port also for receiving altered reply packets containing reply data read from the memory in response to the request; and
    a multiple packet generator that generates a plurality of substitute request packets from an original request packet, each substitute request packet containing a request to read a subset of data requested by the original request packet,
    whereby head-of-line blocking between first and second peripheral endpoint devices is reduced.

2. The enhanced switch with reduced head-of-line blocking of claim 1 further comprising:
    a transaction descriptor extractor that extracts from the original request packet an original tag and a requestor identifier that identifies a requesting peripheral endpoint device in the plurality of peripheral endpoint devices; and
    an alternator that alternates sending to the root complex substitute request packets for a first peripheral endpoint device and for a second peripheral endpoint device in the plurality of peripheral endpoint devices when the first and second peripheral endpoint device both request reading of the memory through the root complex,
    whereby head-of-line blocking between the first and second peripheral endpoint devices is reduced by alternating substitute request packets generated from original request packets.

3. The enhanced switch with reduced head-of-line blocking of claim 2 further comprising:
    a tag mapper that generates a series of substitute tags that replace the original tag in the plurality of substitute packets generated by the multiple packet generator; and
    a read reply re-constructor that replaces substitute tags in the substitute reply packets with the original tag to generate the altered reply packets.

4. The enhanced switch with reduced head-of-line blocking of claim 3 further comprising:
    a mapping table containing mapping entries that associate a series of substitute tags with an original tag for each original request from a peripheral endpoint device in the plurality of peripheral endpoint devices;
    wherein the tag mapper stores the original tag and an indicator for the series of substitute tags in an entry in the mapping table.

5. The enhanced switch with reduced head-of-line blocking of claim 4 wherein the indicator for the series of substitute tags is a first substitute tag in the series of substitute tags and an indicator of a number of substitute request packets in the plurality of substitute request packets generated from the original request packet having the original tag stored in the entry.

6. The enhanced switch with reduced head-of-line blocking of claim 5 wherein entries in the mapping table also store the requestor identifier for an original request packet having the original tag stored in the entry.

7. The enhanced switch with reduced head-of-line blocking of claim 6 wherein substitute tags when combined with the requestor identifier form unique values that uniquely identify a request from a peripheral endpoint device in the plurality of peripheral endpoint devices;
    wherein the requestor identifier comprises:
    a device identifier that uniquely identifies a requesting peripheral endpoint device in the plurality of peripheral endpoint devices;
    a function identifier that uniquely identifies a function within a peripheral endpoint device that generates the original request packet;
    wherein a multi-function requesting peripheral endpoint device is capable of generating requests from a plurality of functions within the multi-function requesting peripheral endpoint device.

8. The enhanced switch with reduced head-of-line blocking of claim 7 wherein the requestor identifier further comprises:
    a bus identifier that uniquely identifies a downlink port in the plurality of downlink ports.

9. The enhanced switch with reduced head-of-line blocking of claim 2 further comprising:
    a forwarding table for storing routing information to identify locations of peripheral endpoint devices in the plurality of peripheral endpoint devices that are connected to the plurality of downlink ports;
    switching logic for routing altered reply packets to a requesting peripheral endpoint device in the plurality of peripheral endpoint devices through a selected downlink port in the plurality of downlink ports,
    whereby altered reply packets are forwarded through the switching logic to the requesting peripheral endpoint device.

10. The enhanced switch with reduced head-of-line blocking of claim 9 further comprising:
    a buffer manager that sends a buffer-credit message to the root complex as the altered reply packets are sent to the requesting peripheral endpoint devices,
    whereby buffer credit is reported back to the root complex.

11. The enhanced switch with reduced head-of-line blocking of claim 2 wherein the root complex is a Peripheral Component Interconnect Express (PCIe) root complex and packets are PCIe packets that follow a PCIe protocol.

12. A machine-implemented method for reading a host memory comprising:

generating in a first peripheral endpoint device a first original request packet in a first peripheral endpoint device, the first original request packet having a first original tag and a first requestor identifier that together uniquely identify a first request;

receiving the first original request packet at a first downlink port of a switch;

generating a first series of substitute request packets from the first original request packet, wherein a substitute tag from a first series of substitute tags replaces the first original tag in each substitute request packet in the first series of substitute request packets;

wherein the first series of substitute requests are smaller requests for reading a subset of a first read block requested to be read by the first original request packet;

storing the first original tag and the first requester identifier in a mapping table with an association for the first series of substitute tags;

generating in a second peripheral endpoint device a second original request packet in a second peripheral endpoint device, the second original request packet having a second original tag and a second requestor identifier that together uniquely identify a second request;

receiving the second original request packet at a second downlink port of the switch;

generating a second series of substitute request packets from the second original request packet, wherein a substitute tag from a second series of substitute tags replaces the second original tag in each substitute request packet in the second series of substitute request packets;

wherein the second series of substitute requests are smaller requests for reading a subset of a second read block requested to be read by the second original request packet;

storing the second original tag and the second requestor identifier in the mapping table with an association for the second series of substitute tags; and alternately sending first substitute request packets from the first series and second substitute request packets from the second series through an uplink port wherein the second substitute request packets are interleaved with the first substitute request packets;

whereby requests from peripheral endpoint devices are divided into smaller requests and alternately sent to reduce head-of-line blocking.

13. The machine-implemented method of claim 12 further comprising:

receiving on the uplink port a plurality of first substitute reply packets containing data read from the host memory in response to the first series of substitute request packets;

reading first substitute reply tags from the plurality of first substitute reply packets;

using the first substitute reply tags to read the first original tag from the mapping table;

replacing the first substitute reply tags with the first original tag from the mapping table to generate first altered reply packets;

forwarding the first altered reply packets to the first peripheral endpoint device;

receiving on the uplink port a plurality of second substitute reply packets containing data read from the host memory in response to the second series of substitute request packets;

reading second substitute reply tags from the plurality of second substitute reply packets;

using the second substitute reply tags to read the second original tag from the mapping table;

replacing the second substitute reply tags with the second original tag from the mapping table to generate second altered reply packets; and forwarding the second altered reply packets to the second peripheral endpoint device.

14. The machine-implemented method of claim 13 further comprising:

reading the first request identifier from the plurality of first substitute reply packets;

using the first request identifier to read first forwarding information from a forwarding table;

routing the plurality of first altered reply packets to the first downlink port to the first peripheral endpoint device using the first forwarding information to configure switch logic;

reading the second request identifier from the plurality of second substitute reply packets;

using the second request identifier to read second forwarding information from the forwarding table; and routing the plurality of second altered reply packets to the second downlink port to the second peripheral endpoint device using the second forwarding information to configure switch logic, whereby altered rely packets are forwarded to downlink ports to requesting peripheral endpoint devices using forwarding information from the forwarding table.

15. The machine-implemented method of claim 14 further comprising:

storing a first substitute tag in the mapping table as the association for the first series of substitute tags;

wherein the first substitute tag is in the first series of substitute tags; and storing a second substitute tag in the mapping table as the association for the second series of substitute tags;

wherein the second substitute tag is in the second series of substitute tags.

16. The machine-implemented method of claim 15 further comprising:

sending a buffer-credit message through the uplink port in response to the first altered reply packets being sent through the first downlink port and in response to the second altered reply packets being sent through the second downlink port, whereby buffer credit is reported through the uplink port.

17. A non-blocking switch comprising:

uplink port means for sending substitute request packets toward a root complex and for receiving substitute reply packets from the root complex, the substitute reply packets containing reply data read from a memory in response to the substitute request packets;

a plurality of downlink port means for connecting to a plurality of peripheral endpoint devices, each downlink port means for receiving original request packets from a peripheral endpoint device with a request to read the memory through the root complex, each downlink port means also for receiving altered reply packets containing reply data read from the memory in response to the request;

multiple packet generator means for generating a plurality of substitute request packets from an original request packet, each substitute request packet containing a request to read a subset of data requested by the original request packet;

transaction descriptor extractor means for reading from the original request packet an original tag and a requestor identifier that identifies a requesting peripheral endpoint device in the plurality of peripheral endpoint devices; and interleave means for alternately sending to the root complex substitute request packets for a first peripheral endpoint device and for a second peripheral endpoint device in the plurality of peripheral endpoint devices when the first and second peripheral endpoint device both request reading of the memory through the root complex, whereby head-of-line blocking between the first and second peripheral endpoint devices is reduced by alternating substitute request packets generated from original request packets.

18. The non-blocking switch of claim 17 further comprising:

tag map means for generating a series of substitute tags that replace the original tag in the plurality of substitute packets generated by the multiple packet generator means;

read reply re-constructor means for replacing substitute tags in the substitute reply packets with the original tag to generate the altered reply packets.

19. The non-blocking switch of claim 18 further comprising:

mapping table means for storing mapping entries that associate a series of substitute tags with an original tag for each original request from a peripheral endpoint device in the plurality of peripheral endpoint devices;

wherein the mapping table means is also for storing the original tag and an indicator for the series of substitute tags in an entry in the mapping table means.

20. The non-blocking switch of claim 17 wherein the requestor identifier comprises:

device identifier means for uniquely identifying a requesting peripheral endpoint device in the plurality of peripheral endpoint devices;

function identifier means for uniquely identifying a function within a peripheral endpoint device that generates the original request packet;

wherein a multi-function requesting peripheral endpoint device is capable of generating requests from a plurality of functions within the multi-function requesting peripheral endpoint device.

* * * * *